US008957373B1

(12) United States Patent
Tiana et al.

(10) Patent No.: US 8,957,373 B1
(45) Date of Patent: Feb. 17, 2015

(54) ARTIFACT PREVENTION SYSTEM, DEVICE, AND METHOD FOR AN ELECTROMAGNETIC IMAGING SYSTEM

(71) Applicants: Carlo L. Tiana, Portland, OR (US); Weston J. Lahr, Sherwood, OR (US); Robert D. Brown, Lake Oswego, OR (US); Duane P. Pond, Tigard, OR (US)

(72) Inventors: Carlo L. Tiana, Portland, OR (US); Weston J. Lahr, Sherwood, OR (US); Robert D. Brown, Lake Oswego, OR (US); Duane P. Pond, Tigard, OR (US)

( * ) Notice: Subject to any disclaimer, the term of this patent is extended or adjusted under 35 U.S.C. 154(b) by 195 days.

(21) Appl. No.: 13/751,244

(22) Filed: Jan. 28, 2013

(51) Int. Cl.
*G01J 5/00* (2006.01)
*H04N 5/235* (2006.01)

(52) U.S. Cl.
CPC .................................. *H04N 5/2353* (2013.01)
USPC ....................................................... 250/338.1

(58) Field of Classification Search
CPC ..................... H04N 5/2355; G06T 2207/20208
USPC .......................................... 250/338.1–338.5
See application file for complete search history.

(56) References Cited

U.S. PATENT DOCUMENTS

2008/0226192 A1* 9/2008 Silverstein et al. ........... 382/276

\* cited by examiner

*Primary Examiner* — Kiho Kim
(74) *Attorney, Agent, or Firm* — Angel N. Gerdzhikov; Donna P. Suchy; Daniel M. Barbieri (57) ABSTRACT

Present novel and non-trivial system, device, and method for preventing artifacts in an electromagnetic imaging system are disclosed. A processing unit may be configured to receive or derive exposure data corresponding to an exposure of electromagnetic radiation; identify each cell of the exposure data exceeding a maximum exposure limit; generate address data representative of an address of each identified cell; and send the address data to a modifiable medium such as (1) an array of reflecting devices that are modifiable through repositioning techniques, (2) an array of transmissive devices that are modifiable to prevent the passage of radiation, and/or (3) an occulting disk whose position is modifiable to prevent the passage of radiation. The exposure data could be comprised of actual exposure data received from a radiation detector. Alternatively, the exposure data could be comprised of calculated exposure data.

23 Claims, 8 Drawing Sheets

ARTIFACT PREVENTION SYSTEM, DEVICE, AND METHOD FOR AN ELECTROMAGNETIC IMAGING SYSTEM

BACKGROUND OF THE INVENTION

1. Field of the Invention

This invention pertains generally to the field of aviation imaging systems.

2. Description of the Related Art

Infrared cameras (or infrared radiation detectors) are employed in airborne applications such as, but not exclusive to, an enhanced vision system and a remote vision system. One type of infrared radiation detector could be a detector known as a microbolometer. A microbolometer may be comprised of an array of cells commonly referred to as pixels. Infrared radiation striking the material of each pixel may heat up the material and change its electrical properties such as its electrical resistance. The resistance change may be measured and processed into temperatures used to create a visible image using techniques known to those skilled in the art.

Although a microbolometer may be operable and produce desired results when exposed to many sources of radiation, there may be an occasion in which the microbolometer is exposed to solar radiation or other high-intensity sources of radiation (e.g., a missile plume). If so, some of the pixels may become over-saturated; that is, a maximum exposure limit of each pixel within an area may have been exceeded, a maximum threshold to which the pixel is designed and defined by a manufacturer of the microbolometer. If the pixel maximum exposure limit is exceeded, the pixel may suffer a physical modification that could render the pixel as unreliable and/or inoperative due to an undesirable alteration of the electrical properties, resulting in an undesirable but likely induction of digital artifacts into the processing of a digital image; moreover, visual artifacts could be presented to the viewer of the digital image.

BRIEF SUMMARY OF THE INVENTION

The embodiments disclosed herein present a novel and non-trivial system, device, and method preventing artifacts in an electromagnetic imaging system. With the embodiments disclosed herein, an infrared camera and/or radiation detector may be prevented from receiving solar radiation and high-intensity radiation from other sources.

In one embodiment, a system for preventing artifacts is disclosed. The system may be comprised of a processing unit and a modifiable medium configured to modify the medium in response to the address data generated by the processing unit. The modifiable medium could be comprised of (1) an array of reflecting devices that are modifiable through repositioning techniques, (2) an array of transmissive devices that are modifiable to prevent the passage of radiation, and/or (3) a variable-position occulting disk to prevent the passage of radiation. In an additional embodiment, the system could be comprised of a source of navigation data used in the calculation of solar position and the scene located in front of a radiation detector.

In another embodiment, a device for preventing artifacts is disclosed. The device may be comprised of a processing unit configured to perform the method discussed in the following paragraph. As embodied herein, the processing unit could be comprised of one or more processing units configured or programmed to generate address data.

In another embodiment, a method for preventing artifacts is disclosed. The method could be comprised of receiving or deriving exposure data corresponding to an exposure of electromagnetic radiation, identifying each cell of the exposure data exceeding a maximum exposure limit, generating address data representative of an address of each identified cell, and sending the address data to a modifiable medium. In one embodiment, the exposure data could be comprised of actual exposure data received from a radiation detector. In another embodiment, the exposure data could be comprised of calculated exposure data determined as a function of solar position and the scene located in front of the radiation detector.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1A:
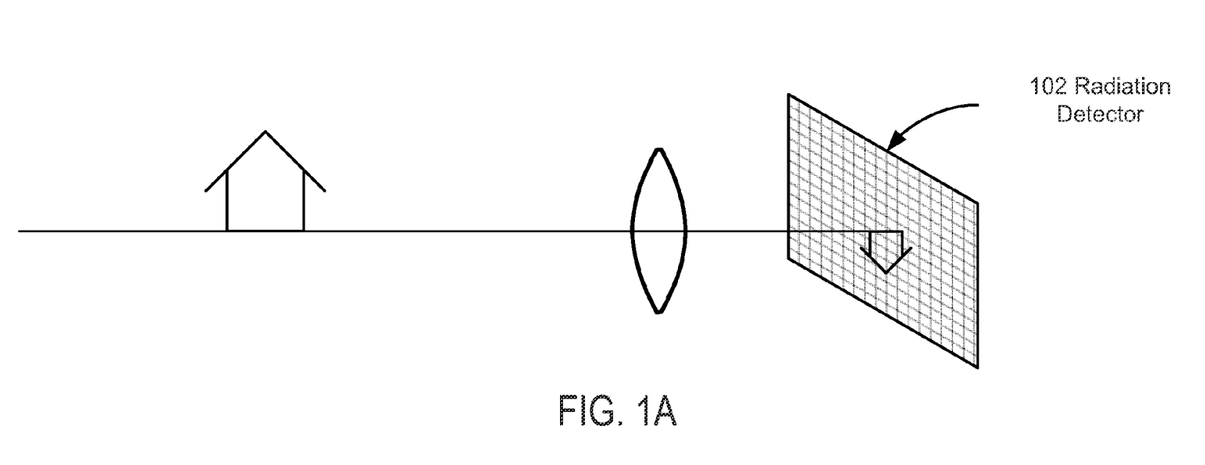
FIG. 1A illustrates a first scene located to the front of a radiation detector.

In an embodiment of FIG. 1A, a scene located to the front of a radiation detector 102 (and a lens) is illustrated; for the sake of simplicity and illustration only, the scene is comprised of a house emitting radiation. The radiation detector 102 could be comprised of any radiation detector used for detecting electromagnetic radiation emitted from a source of radiation. The radiation detector 102 may be employed in a variety of applications including, but not limited to, airborne applications such as an enhanced vision system ("EVS") and a remote vision system ("RVS"). For the purpose of discussion and not of limitation, the discussion of the radiation detector 102 will be drawn to a radiation detector comprised of an infrared radiation detector; however, the embodiments disclosed herein may have applications in which detectors detect radiation in other bands of the electromagnetic spectrum.

For the purpose of illustration and not of limitation, the infrared radiation detector could be a microbolometer comprised of an array of cells commonly referred to as pixels; although the following discussion of the infrared detector will be drawn to a microbolometer, the embodiments herein are not limited to such infrared detector. Infrared radiation striking the material of each pixel may heat up the material and change its electrical properties such as its electrical resistance. The resistance change may be measured and processed into temperatures used to create a visible image using techniques known to those skilled in the art.

Figure 1B:
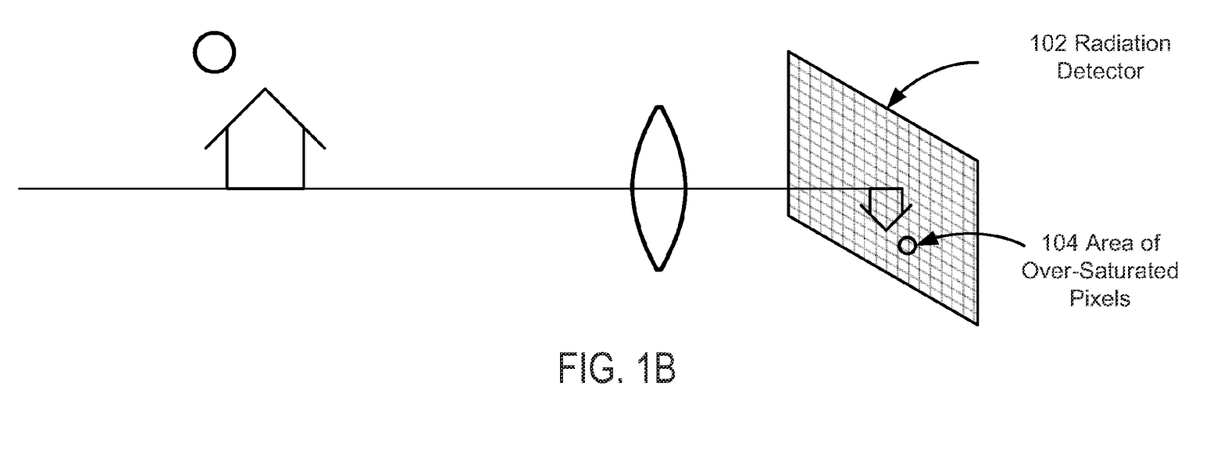
FIG. 1B illustrates a second scene located to the front of a radiation detector

In an embodiment of FIG. 1B, the sun has been added to the scene of FIG. 1A. Although a microbolometer may be operable and produce desired results when exposed to many sources of radiation, there may be an occasion in which the microbolometer is exposed to solar radiation or other intense sources of radiation (e.g., a missile plume). As shown in FIG. 1B, an area of over-saturated pixels 104 is the area correlated to the solar position (i.e., the position of the sun) in the scene in which the pixel(s) detecting the solar radiation may become over-saturated; that is, a maximum exposure limit ("MEL") of each pixel within the area may have been exceeded, a maximum threshold to which the pixel is designed and defined by a manufacturer of the microbolometer. If the pixel MEL is exceeded, the pixel may suffer a physical modification that could render the pixel as unreliable and/or inoperative due to an undesirable alteration of the electrical properties, resulting in an undesirable but likely induction of digital artifacts into the processing of a digital image; moreover, visual artifacts could be presented to the viewer of the digital image.

The advantages and benefits of the embodiments discussed herein may be illustrated in FIGS. 2A through 5 by showing examples of how a modifiable medium such as a modifiable reflecting medium, a modifiable transmissive device, and a variable-position occulting disk may be employed to prevent artifacts. Referring to FIGS. 2A through 2D, a reflecting medium 106 has been placed in the radiation path prior to radiation detector 102; for the sake of illustration, a lens has been placed in between the scene and the reflecting medium 106, and a relay lens has been placed in between the reflecting medium 106 and the radiation detector 102.

Figure 2A:
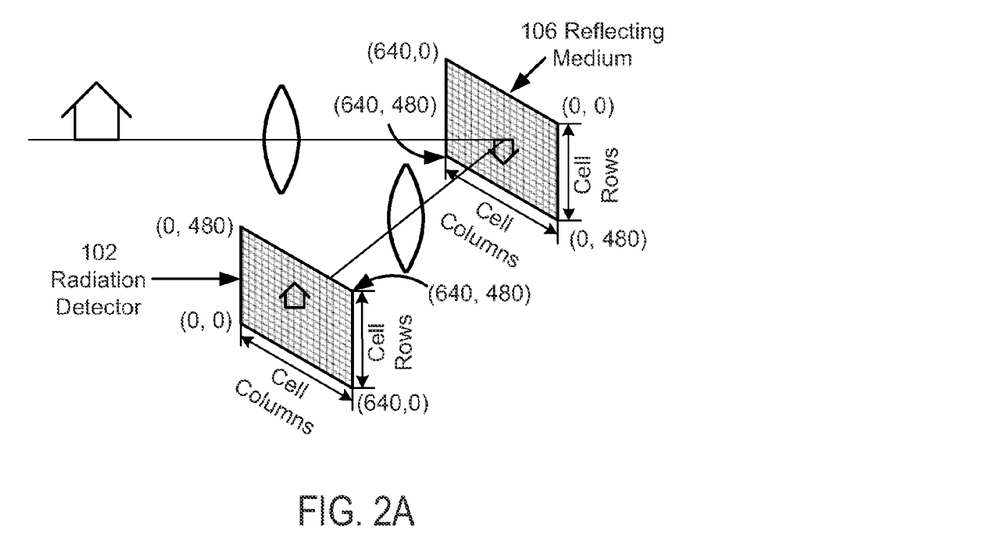
FIG. 2A depicts a radiation detector and a reflecting medium.

For the purpose of illustration and not of limitation, the reflecting medium 106 may be a medium comprised of array of digital micromirror devices utilized in digital light processing. In such devices, each micromirror may be individually rotated (or repositioned) to an on/off state. In an "on" state, each micromirror may be positioned so that radiation striking the micromirror is reflected to the correlated pixel of the radiation detector 102. In the examples of FIGS. 2A through 2D, a correlation exists between the arrays of the reflecting medium 106 and those of the radiation detector 102. Moreover, the addresses of the arrays may be configured to correlate with one another. Radiation striking a micromirror having one address with be reflected to and detected by a cell having the same address. For example, radiation striking a micromirror at address (250, 200) will be reflected towards its correlated cell at address (250, 200). This is shown in FIG. 2A where the radiation emitted from the house of FIG. 1A is striking a micromirror having specific addresses which, in turn, reflect the radiation to the cells having the same addresses.

In an "off" state, the radiation may be reflected away from its correlated cell. As such, radiation striking a micromirror in an "off" state will not be reflected to or detected by its correlated cell. It should be noted that, although the discussion herein will be drawn to reflecting and transmissive mediums comprised of on/off states, the embodiments herein encompass those mediums which allow for partial reflection and/or transmission, thereby attenuating the detected level of radiation.

Figure 3A:
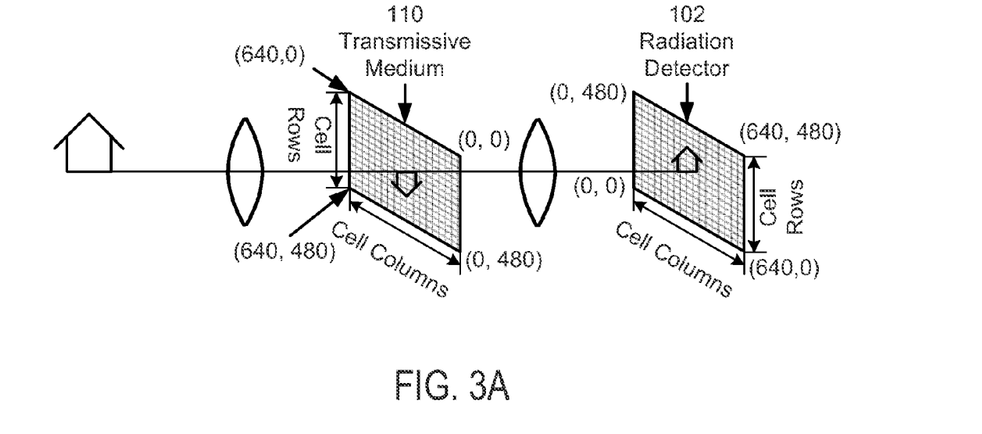
FIG. 3A depicts a radiation detector and a transmissive medium.

As indicated in FIGS. 2A and 3A, the sizes of the radiation detector 102, reflecting medium 106, and transmissive medium 110 are the same. It should be noted that, although the discussion herein will be drawn to these one-to-one correlations, the embodiments disclosed herein are not limited to such correlations but encompass correlations other than one-to-one.

Figure 2B:
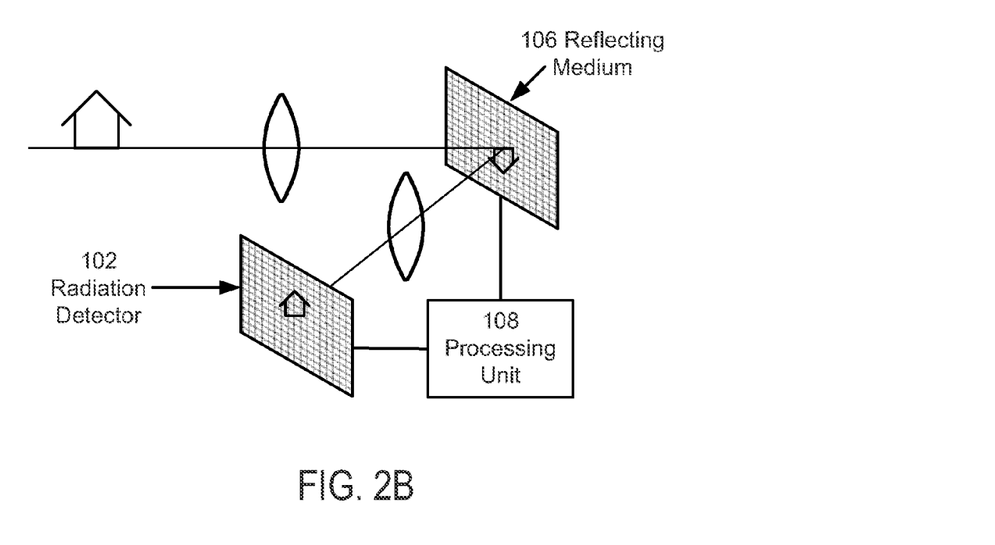
FIG. 2B depicts a processing unit placed in between a radiation detector and a reflecting medium.

Referring to FIG. 2B, a processing unit 108 has been placed in between the radiation detector 102 and the reflecting medium 106 of FIG. 2A. As embodied herein, the processing unit 108 may be any electronic data processing unit or combination of such processing units which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The processing unit 108 may be driven by the execution of software or computer instruction code containing algorithms developed for the specific functions embodied herein. The processing unit 108 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit that have been combined together. As embodied herein, the processing unit 108 could be a processor(s) used by or in conjunction with any other system of the aircraft including, but not limited to, the radiation detector 102, the reflecting medium 106, the transmissive medium 110, and the variable-position occulting disk 112, or any combination thereof.

The processing unit 108 may be programmed or configured to receive as input data representative of information obtained from various systems and/or units including, but not limited to, the radiation detector 102 and a navigation system 110. As embodied herein, the terms "programmed" and "configured" are synonymous. The processing unit 108 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The processing unit 108 may be programmed or configured to execute the method discussed in detail below. The processing unit 108 may be programmed or configured to provide output data to various systems and/or units including, but not limited to, the reflecting medium 106, the transmissive medium 110, and the variable-position occulting disk 112.

Figure 2C:
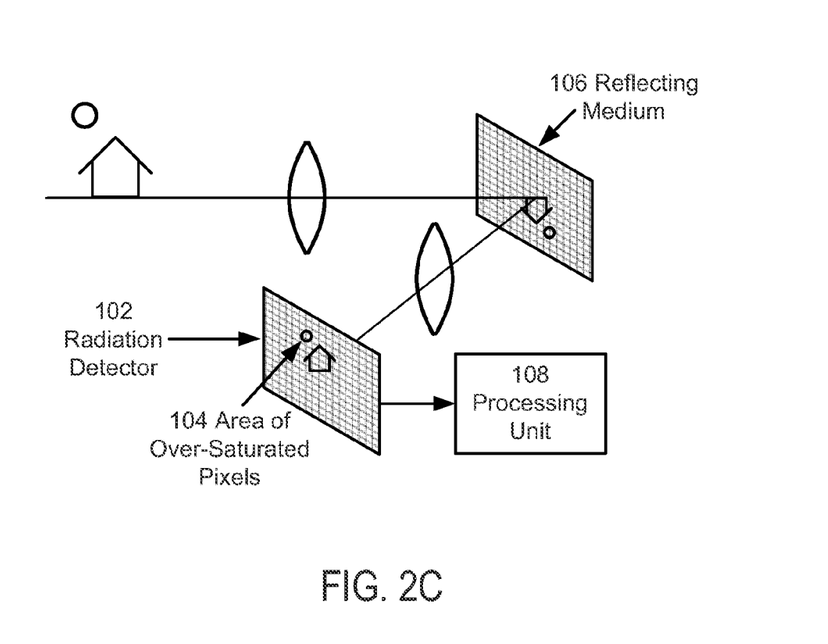
FIG. 2C depicts an area of over-saturated pixels located on a radiation detector.

Referring to FIG. 2C, the solar radiation and the radiation emitted from the house shown in FIG. 1B are striking the micromirrors having specific addresses which, in turn, reflect the radiation to the cells having the same addresses. As discussed above, the area of over-saturated pixels 104 is the area correlated to the solar position in the scene in which the pixel(s) detecting the solar radiation may become over-saturated. As embodied herein, the processing unit 108 may be programmed to receive data representative of the electrical properties of the material for each cell as shown by the arrow in between the radiation detector 102 and the processing unit 108. For those cells receiving solar radiation, the processor may be programmed to identify the cells and/or the locations of the cells at the instant the cells exceed their MEL.

Figure 2D:
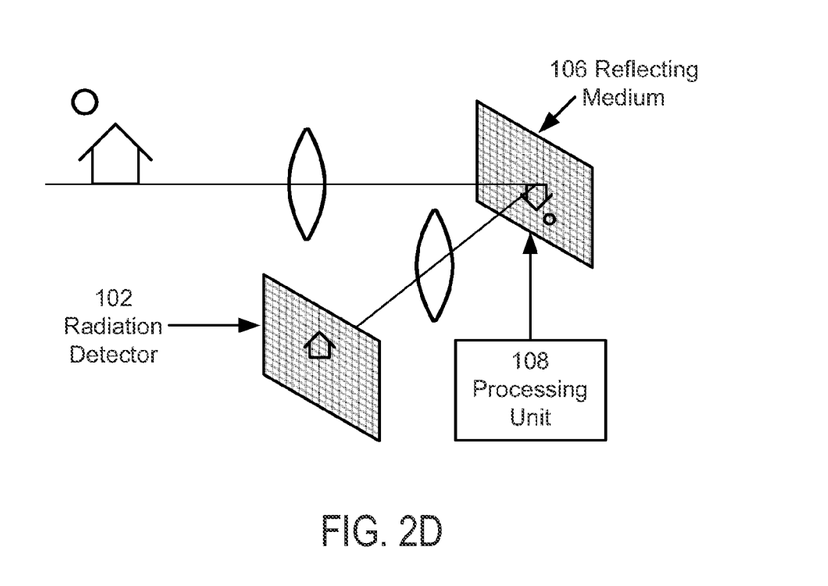
FIG. 2D depicts an absence of over-saturated pixels from a radiation detector.

Referring to FIG. 2D, the processing unit 108 may be further programmed to generate the address data representative of the address of each cell exceeding its MEL and send this address data to the reflecting medium 106 as shown by the arrow in between the processing unit 108 and the reflecting medium 106. In response to receiving the address data, the reflecting medium 106 may reposition correlating micromirrors, i.e., those micromirrors having correlating addresses. For example, the reflecting medium could turn "off" correlating micromirrors. As such, the solar radiation striking the "off" micromirrors (as shown in FIG. 2D) will not be reflected to or detected by its correlated cell which could prevent the induction of digital artifacts into the processing of the digital image and/or the presentation of visual artifacts in the digital image. This is demonstrated by the absence of the sun on radiation detector 102 shown in FIG. 2D.

Referring to FIGS. 3A through 3D, a transmissive medium 110 has been placed in the radiation path prior to radiation detector 102; for the sake of illustration, a lens has been placed in between the scene and the transmissive medium 110, and a relay lens has been placed in between the transmissive medium 110 and the radiation detector 102.

For the purpose of illustration and not of limitation, the transmissive medium 110 may be a medium comprised of array of transmissive devices that may be individually turned to an on/off state. In an "on" state, each transmissive device may be modified to permit the passage of radiation so that radiation passes through the device and to the correlated pixel of the radiation detector 102. Similar to FIGS. 2A through 2D, a correlation exists in the examples of FIGS. 3A through 3D between the arrays of the transmissive medium 110 and those of the radiation detector 102. Moreover, the addresses of the arrays may be configured to correlate with one another. Radiation striking a transmissive device having one address will be passed through the device for detection by a cell having the same address. For example, radiation striking a micromirror at address (150, 100) will be reflected towards its correlated cell at address (150, 100). This is shown in FIG. 3A where the radiation emitted from the house of FIG. 1A is striking a transmissive device having specific addresses which, in turn, passes the radiation to the cells having the same addresses.

In an "off" state, the radiation may be blocked from passing through the device. As such, radiation striking a transmissive device in an "off" state will not pass through.

Figure 3B:
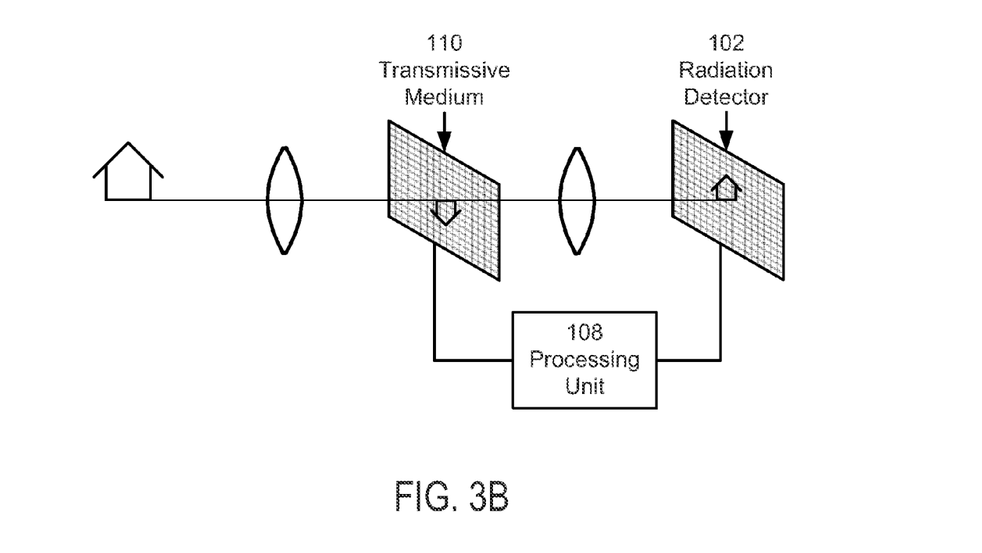
FIG. 3B depicts a processing unit placed in between a radiation detector and a transmissive medium.
Figure 3C:
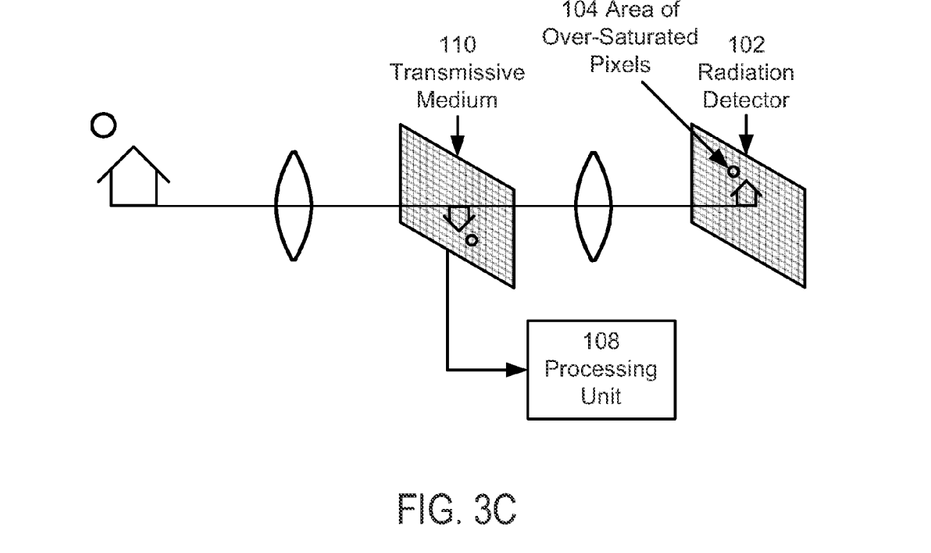
FIG. 3C depicts an area of over-saturated pixels located on a radiation detector.

Referring to FIG. 3B, a processing unit 108 has been placed in between the radiation detector 102 and the transmissive medium 110 of FIG. 3A. Referring to FIG. 3C, the solar radiation and the radiation emitted from the house shown in FIG. 1B is striking the transmissive devices having specific addresses which, in turn, pass through the radiation to the cells having the same addresses. Similar to the FIG. 2C, there is an area of over-saturated pixels 104 in FIG. 3C. As stated above, the processing unit 108 may receive data representative of the electrical properties of the material for each cell as shown by the arrow in between the radiation detector 102 and the processing unit 108. For those cells receiving solar radiation, the processor may be programmed to identify the cells and/or the locations of the cells at the instant the cells exceed their MEL.

Figure 3D:
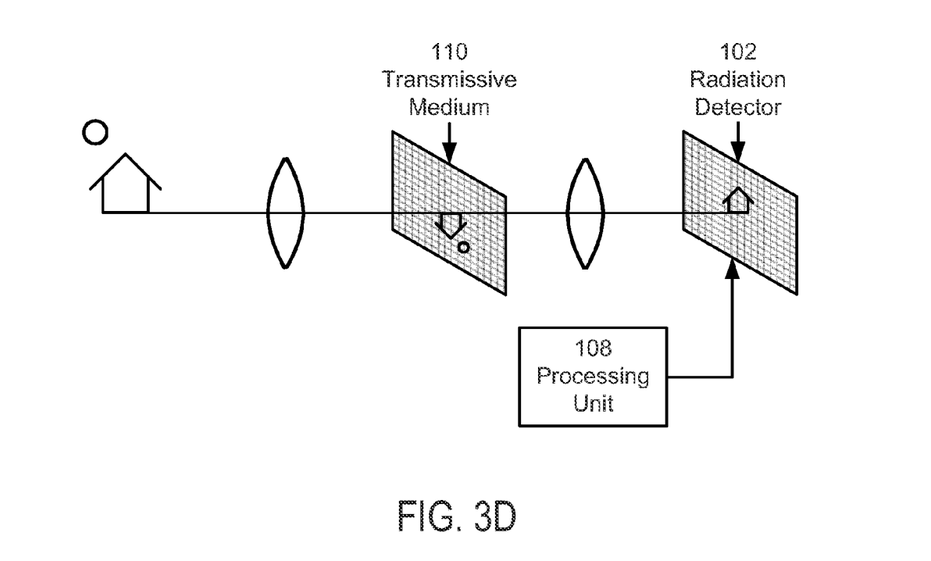
FIG. 3D depicts an absence of over-saturated pixels from a radiation detector.

Referring to FIG. 3D, the processing unit 108 may be further programmed to generate the address data representative of the address of each cell exceeding its MEL and send this address data to the transmissive medium 110 as shown by the arrow in between the processing unit 108 and the reflecting medium 106. In response to receiving the address data, the transmissive medium 110 may turn "off" correlating transmissive devices. As such, the solar radiation striking the "off" transmissive devices (as shown in FIG. 3D) will not be passed through, preventing the induction of digital artifacts into the processing of the digital image and/or the presentation of visual artifacts in the digital image. This is demonstrated by the absence of the sun on radiation detector 102 shown in FIG. 3D.

Although the processing unit 108 disclosed in FIGS. 2B through 2D received input from the radiation detector 102, the prevention of artifacts may be accomplished by employing a second radiation detector (not shown) designed specifically for imaging the sun. If employed, the second radiation detector could employ a field of view slightly larger than the radiation detector 102 to ensure the capture of the sun before it enters the field of view of the radiation detector 102. The processing unit 108 could determine the position and actual size of the sun through direct measurement.

Figure 4A:
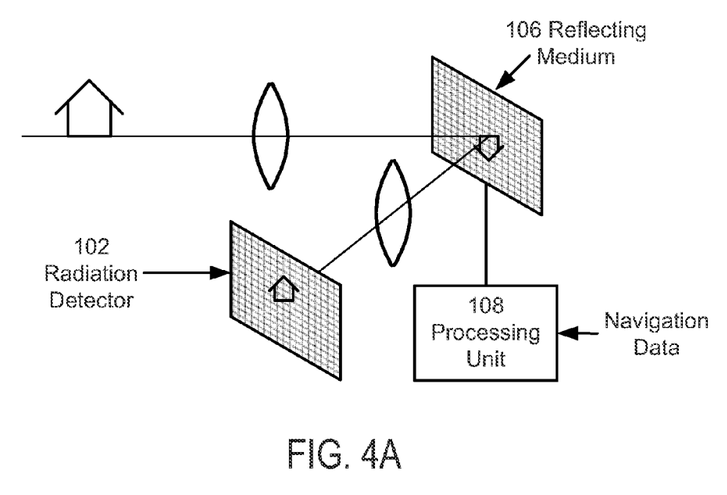
FIG. 4A depicts a processing unit placed in between a source of navigation data and a reflecting medium.
Figure 4B:
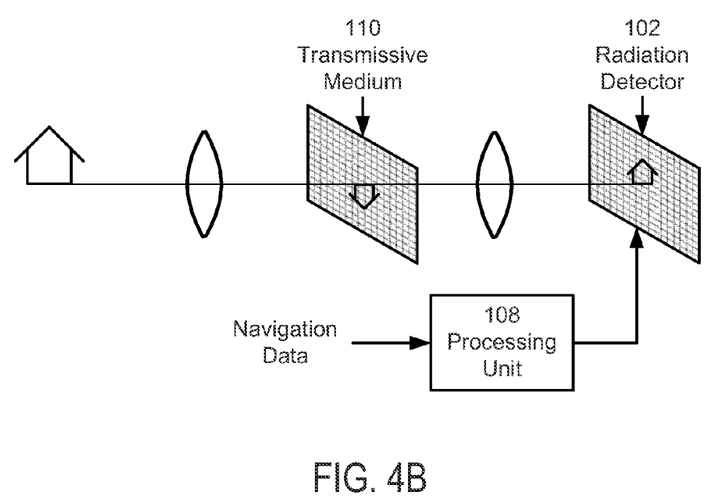
FIG. 4B depicts a processing unit placed in between a source of navigation data and a transmissive medium.

In addition, the prevention of artifacts may be accomplished by calculating the solar position (i.e., the position of the sun) and determine if it's position falls within the scene located to the front of the radiation detector 102. Referring to FIGS. 4A and 4B, the processor 108 could receive navigation data from a navigation data source. The navigation data source may be comprised of one or more systems for acquiring and/or providing navigation data to any vehicular system requiring an input of navigation data. In the field of aviation, the navigation data source may include, but is not limited to, an air/data system, an attitude heading reference system, an inertial guidance system (or inertial reference system), and a global navigation satellite system (or satellite navigation system), all of which are known to those skilled in the art. The navigation data source could provide navigation data including, but not limited to, geographic position, altitude, heading, attitude, date, and time of day. As embodied herein, vehicle position includes geographic position (e.g., latitude and longitude coordinates), altitude, or both. As embodied herein, vehicle orientation may include heading, pitch, roll, and/or yaw information related to the attitude of the vehicle.

Through the use of an algorithm(s) known to those skilled in the art, the scene located to the front of the radiation detector 102 may be determined using navigation data representative of vehicle position and vehicle orientation; similarly, the solar position may be determined using navigation data representative of date, time of day, and vehicle position. Once the scene and solar position have been determined, a determination may be made of whether the solar position falls within the scene. Moreover, an area surrounding the solar position representing the visual size of the sun could be included and set to a default size; alternatively, the area could be set to an apparent size or an angular diameter of the sun as determined through the use of known algorithm(s).

Referring to FIG. 4A, the processing unit 108 has been configured to receive navigation data and provide address data to the reflecting medium 106; referring to FIG. 4B, the processing unit 108 has been configured to receive navigation data and provide address data to the transmissive medium 110. Given the input of navigation data, the processing unit 108 may be programmed to determine the solar position, determine an area of the sun surrounding the solar position which corresponds to an apparent size or an angular diameter of the sun, and/or determine whether the sun falls within the scene located to the front of the radiation detector 102 after determining the scene and the solar position using the navigation data. If the location of the sun is found within the scene, then each cell in an area of cells of the radiation detector 102 correlating of the area of the sun could be identified by default as exceeding its MEL.

After these cells have been identified, the processing unit 108 may be further programmed to generate the address data representative of the address of each cell identified as exceeding its MEL and send this address data to the reflecting medium 106 as shown in FIG. 4A or the transmissive medium 110 as shown in FIG. 4B. In response to receiving the address data, the reflecting medium 106 may reposition correlating micromirrors, i.e., those micromirrors having correlating addresses. Likewise, in response to receiving the address data, the transmissive medium 110 may shut "off" correlating transmissive devices to prevent radiation from being passed through.

Figure 5:
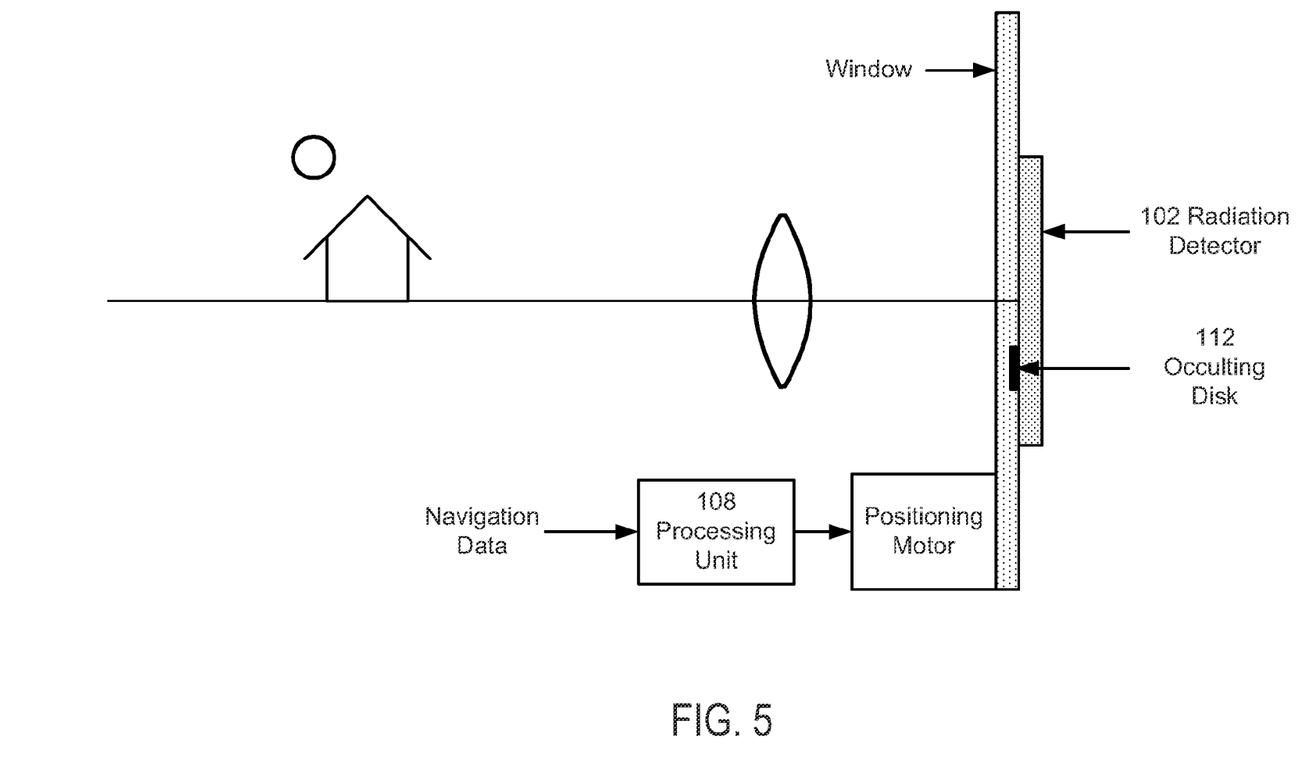
FIG. 5 depicts a modifiable medium of a variable-position occulting disk.

In an embodiment of FIG. 5, the modifiable-medium may be comprised of a variable-position occulting disk 112. For the sake of illustration and not of limitation, a window positioned by a positioning motor (e.g., X-Y stepper motor) has been coated with reflective coating to form the occulting disk 112. As discussed above, after the solar position has been calculated and used to determine whether that the sun falls within the scene, cells within of an area of cells of the radiation detector 102 may be identified by default as exceeding its MEL. After address data of these identified cells has been generated, it may be sent to a variable-position occulting disk 112 via a positioning motor, where such motor may respond by positioning the occulting disk 112 at an address correlated to address of each identified cell; as such, the occulting disk 112 may be positioned to prevent the exposure of solar radiation by the radiation detector 102.

It should be noted that, although the preceding discussion has been drawn to the known position of the sun, the embodiments herein encompass known positions of other high-intensity radiation sources. For example, if the radiation detector 102 may be exposed to a high-intensity radiation source such as, but not limited to, a laser beam having a fixed position, the position of such source may be made accessible to the processing unit 108 for subsequent processing.

Figure 6:
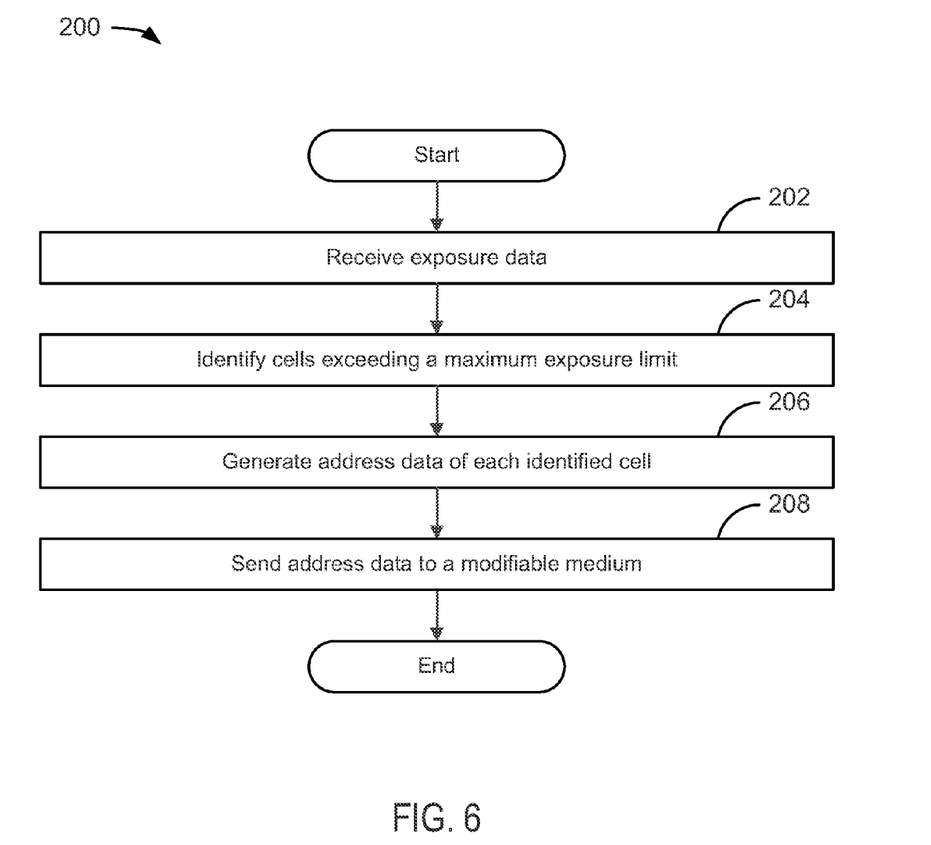
FIG. 6 depicts a flowchart illustrating a method for preventing artifacts in an electromagnetic imaging system.

FIG. 6 depicts flowchart 200 disclosing an example of a method for preventing artifacts in an electromagnetic imaging system, where the processing unit 108 may be programmed or configured with instructions corresponding to the following modules embodied in flowchart 200. As embodied herein, the processing unit 108 may be a processor or a combination of processors as discussed above. Also, the processing unit 108 may be a processor of a module such as, but not limited to, a printed circuit card having one or more input interfaces to facilitate the two-way data communications of the processing unit 108, i.e., the receiving and providing of data. As necessary for the accomplishment of the following modules embodied in flowchart 200, the receiving of data is synonymous and/or interchangeable with the retrieving of data, and the sending of data is synonymous and/or interchangeable with the making available or supplying of data.

As shown in FIG. 6, flowchart 200 begins with module 202 with the receiving of exposure data corresponding to an exposure of electromagnetic radiation. As embodied herein, the electromagnetic radiation may be comprised of infrared radiation.

In one embodiment, the exposure data could be actual exposure data comprised of data representative of a scene located to the front (e.g., located in the field of view) of the radiation detector 102 that has been received by the radiation detector 102. In another embodiment, the exposure data could be actual exposure data comprised of data representative of a scene located to the front of the radiation detector 102 in which the solar position and/or size of the sun has been detected by a second radiation detector designed specifically for imaging the sun. In another embodiment, the exposure data could be derived exposure data comprised of data representative of a scene located to the front of the radiation detector 102 in which the solar position or an area surrounding or encompassing the solar position falls within the scene. As embodied herein, the area encompassing the solar position representing the visual size of the sun could be set to a default size; alternatively, the area could be set to an apparent size or an angular diameter of the sun. In an additional embodiment, the exposure data could be comprised of both derived exposure data and actual exposure data.

The flowchart continues with module 204 with the identifying of each cell of the exposure data exceeding a MEL. In one embodiment, a MEL could be comprised of a maximum threshold to which the cell is designed, beyond which a physical modification to the cell could occur and render the cell unreliable and/or inoperative. In another embodiment, each cell in an area of cells correlating to the area encompassing the solar position could be identified by default as exceeding its MEL; that is, if a cell falls within an area correlating to the area encompassing the solar position, an identification by default could be made.

The flowchart continues with module 206 with the generation of address data responsive to the identification of at least one cell of the exposure data exceeding a MEL. The address data could be representative of the address of each cell identified as exceeding its MEL.

The flowchart continues with module 208 with the sending of the identified cell data to a modifiable medium, where the medium may be modified in response to receiving the address data. In an embodiment in which the modifiable medium is comprised of the reflecting medium 106, the medium may be modified by repositioning each reflective device correlated to an identified cell, thereby preventing the identified cell from being exposed to radiation and/or excessive radiation (i.e., radiation exceeding the MEL). In an embodiment in which the modifiable medium is comprised of the transmissive medium 110, the medium may be modified by blocking the passage of radiation at each transmissive device correlated to an identified cell, thereby preventing the identified cell from being exposed to radiation and/or excessive radiation. In an embodiment in which the modifiable medium is comprised of a variable-position occulting disk 112, the medium may be modified through changes of its position to prevent the exposure of solar radiation by the radiation detector 102, thereby preventing the identified cells from being exposed to radiation and/or excessive radiation. Then, the flowchart proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for preventing artifacts in an electromagnetic imaging system, such system comprising:
   a processing unit configured to
      receive or derive first exposure data corresponding to an exposure of electromagnetic radiation,
      identify each cell of the exposure data exceeding a maximum exposure limit,
      generate address data representative of an address of each identified cell, and
      send the address data to a modifiable medium; and
   the modifiable medium configured to
      receive the address data, and
      modify the medium in response to the address data, such that
         a subsequent exposure to electromagnetic radiation exceeding the maximum exposure limit is prevented at each identified cell.

2. The system of claim 1, wherein the electromagnetic radiation is comprised of infrared radiation.

3. The system of claim 1, wherein the first exposure data is comprised of second exposure data received from an electromagnetic radiation detector.

4. The system of claim 1, wherein
   the first exposure data is comprised of
      third exposure data derived from navigation data, and representative of a scene in front of an electromagnetic radiation detector within which the position of the sun or a first area falls, where
         the first area is an area encompassing the sun, and
   each cell located within a second area is identified as exceeding a maximum exposure limit, where
      the second area is correlated to the first area.

5. The system of claim 4, wherein the first area is an apparent size or an angular diameter of the sun.

6. The system of claim 4, wherein the first exposure data is further comprised of second exposure data received from an electromagnetic radiation detector.

7. The system of claim 4, wherein
   the modifiable medium is comprised of variable-position occulting disk, and
   the medium is modified by positioning the variable-position occulting disk to prevent the passage of electromagnetic radiation.

8. The system of claim 1, wherein
   the modifiable medium is comprised of an array of reflecting devices, and
   the medium is modified by repositioning each reflecting device correlated to an identified cell.

9. The system of claim 1, wherein
   the modifiable medium is comprised of an array of transmissive devices, and
   the medium is modified by blocking the passage of electromagnetic radiation at each transmissive device correlated to an identified cell.

10. A device for preventing artifacts in an electromagnetic imaging system, such device comprising:
    a processing unit configured to
       receive or derive first exposure data corresponding to an exposure of electromagnetic radiation,
       identify each cell of the exposure data exceeding a maximum exposure limit,
       generate address data representative of an address of each identified cell, and
       send the address data to a modifiable medium; and
       the medium is modified in response to the address data, such that
          a subsequent exposure to electromagnetic radiation exceeding the maximum exposure limit is prevented at each identified cell.

11. The device of claim 10, wherein the first exposure data is comprised of second exposure data received from an electromagnetic radiation detector.

12. The device of claim 10, wherein
    the first exposure data is comprised of
       third exposure data derived from navigation data, and representative of a scene in front of an electromagnetic radiation detector within which the position of the sun or a first area falls, where
          the first area is an area encompassing the sun, and
    each cell located within a second area is identified as exceeding a maximum exposure limit, where
       the second area is correlated to the first area.

13. The device of claim 12, wherein the first exposure data is further comprised of second exposure data received from an electromagnetic radiation detector.

14. The device of claim 12, wherein
    the modifiable medium is comprised of variable-position occulting disk, and
    the medium is modified by positioning the variable-position occulting disk to prevent the passage of electromagnetic radiation.

15. The device of claim 10, wherein
    the modifiable medium is comprised of an array of reflecting devices, and
    the medium is modified by repositioning each reflecting device correlated to an identified cell.

16. The device of claim 10, wherein
    the modifiable medium is comprised of an array of transmissive devices, and
    the medium is modified by blocking the passage of electromagnetic radiation at each transmissive device correlated to an identified cell.

17. A method for preventing artifacts in an electromagnetic imaging system, such method comprising:
    receiving or derive first exposure data corresponding to an exposure of electromagnetic radiation;
    identifying each cell of the exposure data exceeding a maximum exposure limit;
    generating address data representative of an address of each identified cell; and
    sending the address data to a modifiable medium, where the medium is modified in response to the address data, such that
       a subsequent exposure to electromagnetic radiation exceeding the maximum exposure limit is prevented at each identified cell.

18. The method of claim 17, wherein the first exposure data is comprised of second exposure data received from an electromagnetic radiation detector.

19. The method of claim 17, wherein
the first exposure data is
third exposure data derived from navigation data, and
representative of a scene in front of an electromagnetic radiation detector within which the position of the sun or a first area falls, where
the first area is an area encompassing the sun, and
each cell located within a second area is identified as exceeding a maximum exposure limit, where
the second area is correlated to the first area.

20. The method of claim 19, wherein the first exposure data is further comprised of second exposure data received from an electromagnetic radiation detector.

21. The method of claim 19, wherein
the modifiable medium is comprised of variable-position occulting disk, and
the medium is modified by positioning the variable-position occulting disk to prevent the passage of electromagnetic radiation.

22. The method of claim 17, wherein
the modifiable medium is comprised of an array of reflecting devices, and
the medium is modified by repositioning each reflecting device correlated to an identified cell.

23. The method of claim 17, wherein
the modifiable medium is comprised of an array of transmissive devices, and
the medium is modified by blocking the passage of electromagnetic radiation at each transmissive device correlated to an identified cell.

* * * * *